Patented Feb. 20, 1951

2,542,327

UNITED STATES PATENT OFFICE 2,542,327

WATER-SOLUBLE PHTHALOCYANINES CONTAINING QUATERNARY OR TERNARY SALT GROUPS AND SYNTHESIS THEREOF

Norman Hulton Haddock and Clifford Wood, Blackley, England, assignors to Imperial Chemical Industries Limited, a corporation of Great Britain No Drawing. Application March 18, 1949, Serial No. 82,294. In Great Britain December 6, 1944

14 Claims. (Cl. 260—314.5)

The present invention relates to the manufacture of new water-soluble phthalocyanine derivatives and, more particularly, relates to phthalocyanine derivatives which contain quaternary or ternary salt groups and are green dyestuffs suitable for dyeing textile materials.

This application is a continuation-in-part of our copending application, Serial No. 632,786, filed December 4, 1945, now U. S. Patent 2,464,806.

According to the present invention, we manufacture the new water-soluble phthalocyanine derivatives from phthalocyanine compounds which carry pendant aryl nuclei directly attached to the phenylene nuclei of the fundamental phthalocyanine complex and bear $n$ chloromethyl or bromomethyl groups, wherein $n$ represents a numeral greater than 1 and at least $(n-1)$ of the chloro- or bromo-methyl groups are carried in the pendant aryl nuclei, by a process which comprises treating the phthalocyanine compound by known methods for replacing the chlorine or bromine atoms thereof by quaternary or ternary salt groups.

The new water-soluble derivatives thus obtained are compounds of the formula $(R(CH_2X)_n$, wherein R represents the molecule of a metal or metal-free phthalocyanine compound carrying pendant aryl nuclei directly attached to the phenylene nuclei of the fundamental phthalocyanine complex, $n$ is a number greater than 1, at least $(n-1)$ of the —CH$_2$X radicals being carried in the pendant aryl groups, and X is a quaternary or ternary salt group.

Phthalocyanine derivatives containing at least two chloro- or bromo-methyl groups may be made, as is described in our U. S. Patent 2,435,307, by heating a metal or metal-free substituted or unsubstituted phthalocyanine with aluminum chloride and a substance which is either of itself a chloromethylating or bromomethylating agent, for instance symmetrical dichloromethyl or dibromomethyl ether, or with a substance which acts as a chloromethylating agent in the presence of aluminum chloride, for instance paraformaldehyde. The heating is preferably carried out in the further presence of a tertiary amine, which is not itself susceptible of chloro- or bromo-methylation, as typified by triethylamine and pyridine.

Suitable phthalocyanine derivatives for use in the process of the present invention include, for example, copper octa-(chloromethyl)-tetra-4-phenyl - phthalocyanine, and copper tetra-(chloromethyl)-tetra-4-phenyl - phthalocyanine.

The chlorine or bromine atoms of the chloro- or bromo-methyl derivatives of phthalocyanine are replaced by quaternary or ternary salt groups as said by known means. These include, for example:

(1) Heating the chloro- or bromo-methyl derivative with a tertiary amine to convert it to a quaternary ammonium salt. Suitable tertiary amines for this purpose include, for example, pyridine, hexahydrodimethylaniline, triethylamine, and diethylaminoethyl alcohol.

(2) Causing the chloro- or bromo-methyl derivative to react with an alkali metal derivative of a mercaptan of the formula RSH wherein R may be a substituted or unsubstituted alkyl, cycloalkyl, aralkyl or aryl radical, thus replacing the chlorine or bromine atoms by RS— radicals, and then treating the so-obtained sulphide with such an ester as is known to convert sulphides into ternary sulphonium salts, for example with dimethylsulphate or methyl p-toluenesulphonate. Suitable mercaptans which may be used in this process include, for example, methyl mercaptan, n-butyl mercaptan, cyclo-hexyl mercaptan, benzyl mercaptan thiophenol and p-thiocresol.

(3) Causing the chloro- or bromo-methyl derivative to react with a thiourea so as to convert it into an isothiouronium salt. Suitable thioureas which may be used for this purpose include thiourea, N-methylthiourea, N-phenylthiourea, N:N'-dimethylthiourea, N:N - dimethylthiourea, N:N:N'-trimethylthiourea, and tetramethylthiourea.

The new phthalocyanine derivatives of this invention are soluble in water giving bright green solutions from which cotton or other textile material is dyed in bright green shades of very good fastness to washing treatments and to light. In some cases, it is advantageous to assist solution in water, for example by the addition of suitable surface tension reducing agents. We have found that condensation products of β-naphthol and ethylene oxide are particularly suitable for this purpose. It is a further feature of the invention to use these quaternary and ternary salts as dyestuffs.

The invention is illustrated but not limited by the following examples in which parts are by weight:

Example 1

A mixture of 5 parts of copper octa-(chloromethyl)-tetra-4-phenyl-phthalocyanine (made as described below), 12 parts of tetramethylthiourea and 12 parts of water is heated at 95–100° C. for 10 minutes. The green solution so obtained is cooled and diluted with 50 parts of acetone, and the green solid which is precipitated is filtered off, washed with acetone and dried by exposure. It is a green powder, which dissolves in water to give a bright yellowish-green solution. This solution dyes cotton in bright yellowish-green shades.

The copper octa-(chloromethyl)-tetra-4-phenyl phthalocyanine employed above is made as follows: A mixture of 100 parts of anhydrous aluminum chloride and 132 parts of sym-dichlorodimethyl ether is stirred until the aluminum chloride has dissolved and 10 parts of copper tetra-4-phenyl-phthalocyanine are added, while the temperature is maintained between 20° C. and 25° C. The resulting dark grey solution is stirred at 25° C. during 60 minutes, and it is then poured into the mixture of 300 parts of water and 90 parts of concentrated hydrochloric acid, the temperature being kept between 20° C. and 30° C. by the addition of ice as necessary. The mixture is filtered and the green solid residue is washed first with water until it is free from acid, and then with ethyl alcohol. It is then dried at 60° C. and a bright green powder is thus obtained. It contains 22.5% of chlorine and consists principally of copper octa-(chloromethyl)-tetra-4-phenyl-phthalocyanine.

*Example 2*

10 parts of copper tetra-(chloromethyl)-tetra-4-phenyl-phthalocyanine (made as described below) and 100 parts of pyridine are boiled with stirring for 10 minutes. 60 parts of water are added to the bright green suspension and the mixture is boiled for a further 5 minutes. The bright green solution so obtained is cooled and diluted with 400 parts of acetone and the green solid which separates is filtered off, washed with acetone and dried by exposure. A bright green powder is obtained which dissolves readily in water to give a bright yellowish-green solution. This solution dyes cotton in bright yellowish-green shades.

The copper tetra-(chloromethyl)-tetra-4-phenyl-phthalocyanine employed above is made as follows:

A mixture of 5.72 parts of copper tetra-4-phenyl-phthalocyanine, 100 parts of nitrobenzene and 22 parts of anhydrous aluminum chloride is stirred for 10–15 minutes. A solution of 6 parts of sym-dichlorodimethyl ether in 25 parts of nitrobenzene is then added to the mixture during 15 minutes at 25°–30° C. The mixture is maintained at 25°–30° C. during 3 hours and then 20 parts of 20% aqueous hydrochloric acid are added sufficiently slowly so that the temperature does not rise above 30° C. 200 parts of ethyl alcohol are then added and the mixture is filtered. The residual solid is washed with ethyl alcohol and then with water. It is then boiled with 200 parts of 5% aqueous hydrochloric acid, the resulting mixture is filtered and the residual solid is washed free from acid with water. It is dried at 60° C. and a bright green powder is obtained. It contains 13% of chlorine and consists principally of copper tetra-(chloromethyl)-tetra-4-phenyl-phthalocyanine.

By carrying out the chloromethylation at a temperature of about 23°–25° C., a trichloromethyl compound is formed.

*Example 3*

In place of the 5 parts of copper octa-(chloromethyl)-tetra-4-phenyl-phthalocyanine used in Example 1, there are used 5 parts of copper tetra-(chloromethyl)-tetra-4-phenyl-phthalocyanine. The residue obtained is a green powder, which may be named copper tetra-(methylene-tetramethyl-isothiouronium chloride)-4-phenyl-phthalocyanine. It is soluble in water and the solution dyes cotton in bright yellowish-green shades.

*Example 4*

10 parts of copper tetra-(chloromethyl)-tetra-4-phenyl-phthalocyanine and 100 parts of β-ethoxyethanol are milled together during 16 hours with 80 parts of coarse gravel in a bottle rotating at about 150 revolutions per minute. The fine suspension so obtained is separated from the gravel and a solution of 14.6 parts of sodium methylmercaptide in 100 parts of ethyl alcohol is added. The mixture is heated to 100° C. during one hour, some of the alcohol being thereby distilled off. The suspension is filtered and the solid residue washed with ethyl alcohol and then with water. The copper tetra-(methylmercaptomethyl)-tetra-4-phenyl-phthalocyanine so obtained is heated with 65 parts of dimethyl sulphate at 90° C. for 15 minutes. The mixture is then cooled and 150 parts of acetone are added. The solid in suspension is filtered off, washed with acetone and dried by exposure to air. The bright green powder so obtained is soluble in water and the solution dyes cotton in bright yellowish-green shades.

The structure of the novel compounds obtained according to this invention is typified by that of the product obtained in Example 3 which appears to be as follows:

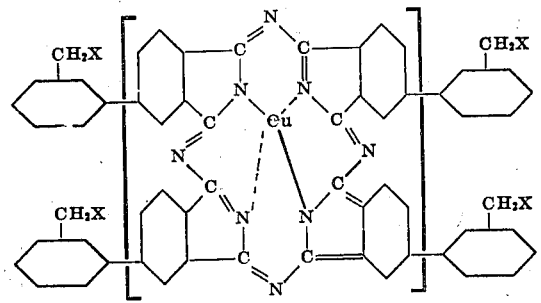

wherein X is the tetramethyl-isothiouronium chloride radical graphically represented as follows:

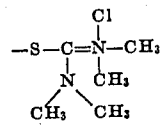

That portion of the molecule within the square brackets is the "fundamental phthalocyanine complex" referred to above and in the claims below. The benzene rings of the same are described as the "fundamental phenylene nuclei" or as the "phenylene nuclei of the fundamental phthalocyanine complex" in order to distinguish the same from the pendant phenyl groups.

In the other examples given above, the methylene isothiouronium salt radical is replaced by a methylene quaternary ammonium salt radical typified by —CH$_2$—N(C$_5$H$_5$)—Cl (the methylene pyridinium chloride radical) or by a methylene sulfonium salt radical

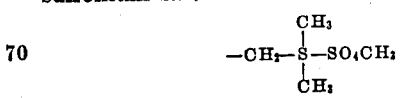

The "onium salt radical" mentioned in the claims is to be understood as embracing the salt radical attached to the CH$_2$ group.

It is also to be understood that the expression "quaternary ammonium" when referring to a compound or radical in the claims below is a generic phrase which includes non-cyclic ammonium salts as well as pyridinium and similar heterocyclic nitrogenous base compounds.

Having thus described our invention, what we claim as new is:

1. A phthalocyanine compound selected from the group consisting of metal-phthalocyanines and metal-free phthalocyanines which carry pendant aryl nuclei directly attached to the phenylene nuclei of the fundamental phthalocyanine complex, and characterized by bearing $n$ radicals of the type —$CH_2X$, wherein $n$ represents a numeral greater than 1, at least $(n-1)$ of said radicals being carried in said pendant aryl nuclei, and X represents an onium salt radical selected from the group consisting of the sulfonium, isothiouronium and quaternary ammonium salts of water-soluble acids.

2. A water-soluble metal phthalocyanine compound carrying pendant aryl nuclei attached directly to the phenylene nuclei of the fundamental phthalocyanine complex, and characterized by bearing $n$ radicals of the type —$CH_2X$, wherein $n$ represents a numeral greater than 1, at least $(N-1)$ of said radicals being carried in said pendant aryl nuclei, and X represents an onium salt radical selected from the group consisting of the sulfonium, isothiouronium and quaternary ammonium salts of water-soluble acids.

3. A copper phthalocyanine compound carrying pendant aryl nuclei attached directly to the phenylene nuclei of the fundamental phthalocyanine complex, and characterized by bearing $n$ radicals of the type —$CH_2X$, wherein $n$ represents a numeral greater than 1, at least $(n-1)$ of said radicals being carried in said pendant aryl nuclei, and X represents an onium salt radical selected from the group consisting of the sulfonium, isothiouronium and quaternary ammonium salts of water-soluble acids.

4. A copper phthalocyanine compound carrying pendant aryl nuclei attached directly to the phenylene nuclei of the fundamental phthalocyanine complex, and characterized by bearing $n$ methylene-ternary-sulfonium salt radicals, wherein $n$ represents a numeral greater than 1, at least $(n-1)$ of said radicals being carried in said pendant aryl nuclei.

5. A copper phthalocyanine compound carrying pendant aryl nuclei attached directly to the phenylene nuclei of the fundamental phthalocyanine complex, and characterized by bearing $n$ methylene-isothiouronium halide radicals, wherein $n$ represents a numeral greater than 1, at least $(n-1)$ of said radicals being carried in said pendant aryl nuclei.

6. A copper phthalocyanine compound carrying pendant aryl nuclei attached directly to the phenylene nuclei of the fundamental phthalocyanine complex, and characterized by bearing $n$ methylene-quaternary ammonium halide radicals, wherein $n$ represents a numeral greater than 1, at least $(n-1)$ of said radicals being carried in said pendant aryl nuclei.

7. A copper phthalocyanine compound carrying pendant aryl nuclei attached directly to the phenylene nuclei of the fundamental phthalocyanine complex, and characterized by bearing $n$ methylene-pyridinium halide radicals, wherein $n$ represents a numeral greater than 1, at least $(n-1)$ of said radicals being carried in said pendant aryl nuclei.

8. A copper phthalocyanine compound consisting of copper tetra-4-phenyl-phthalocyanine bearing $n$ radicals of the type —$CH_2X$, wherein $n$ represents a numeral greater than 1, at least $(n-1)$ of said radicals being carried in the pendant aryl nuclei, and X represents an onium salt radical selected from the group consisting of the sulfonium, isothiouronium and quaternary ammonium salts of water-soluble acids.

9. Copper tetra-(methylene-tetramethyl-isothiouronium chloride)-4-phenyl-phthalocyanine.

10. In a process for producing water-soluble derivatives from phthalocyanine compounds which carry pendant aryl nuclei directly attached to the phenylene nuclei of the fundamental phthalocyanine complex and bear $n$ methylene halide radicals selected from the group consisting of $CH_2Cl$ and $CH_2Br$, wherein $n$ represents a numeral greater than 1, and at least $(n-1)$ of said radicals are carried in said pendant aryl nuclei, the step which comprises replacing the halide atoms of said phthalocyanine compound with an onium salt radical selected from the group consisting of the sulfonium, isothiouronium and quaternary ammonium salts of water-soluble acids.

11. A process as claimed in claim 10 wherein said phthalocyanine compound is treated with a tertiary amine to replace the halide atoms with quaternary ammonium salt radicals.

12. A process as claimed in claim 10 wherein said phthalocyanine compound is reacted with a thiourea to replace the halide radicals with isothiouronium salt radicals.

13. A process as claimed in claim 10 wherein said phthalocyanine compound is reacted with an alkali-metal salt of a mercaptan selected from the group consisting of alkyl, aralkyl and aryl mercaptans, and then subjecting the intermediate thus obtained to reaction with a methyl ester, whereby to convert the mercaptide radical into a ternary sulfonium salt radical.

14. A process of producing a water-soluble dyestuff of the phthalocyanine series which comprises reacting copper tetra-(chloromethyl)-tetra-4-phenyl-phthalocyanine with tetramethylthiourea thus producing copper tetra-(methylene-tetramethyl - isothiouronium chloride) - 4 - phenyl-phthalocyanine.

NORMAN HULTON HADDOCK.
CLIFFORD WOOD.

No references cited.